US011804007B2

(12) United States Patent
Coffey et al.

(10) Patent No.: US 11,804,007 B2
(45) Date of Patent: Oct. 31, 2023

(54) 3D DIGITAL MODEL SURFACE RENDERING AND CONVERSION

(71) Applicant: Disney Enterprises, Inc., Burbank, CA (US)

(72) Inventors: Dane M. Coffey, Burbank, CA (US); Siroberto Scerbo, Montrose, CA (US); Evan M. Goldberg, Burbank, CA (US); Christopher Richard Schroers, Zürich (CH); Daniel L Baker, Los Angeles, CA (US); Mark R. Mine, Canyon Country, CA (US); Erika Varis Doggett, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 17/218,920

(22) Filed: Mar. 31, 2021

(65) Prior Publication Data
US 2022/0319104 A1   Oct. 6, 2022

(51) Int. Cl.
*G06T 15/20* (2011.01)
*G06T 15/04* (2011.01)
(Continued)

(52) U.S. Cl.
CPC ............ *G06T 15/205* (2013.01); *G06T 15/04* (2013.01); *G06T 15/50* (2013.01); *G06T 17/20* (2013.01);
(Continued)

(58) Field of Classification Search
None
See application file for complete search history.

(56) References Cited

U.S. PATENT DOCUMENTS

| 5,894,308 A * | 4/1999 | Isaacs | G06T 17/20 345/420 |
| 2003/0011596 A1 * | 1/2003 | Zhang | G06T 15/506 345/426 |

(Continued)

FOREIGN PATENT DOCUMENTS

KR    1018 17753 B1    1/2018

OTHER PUBLICATIONS

"Image-based medeling and rendering" (Wikipedia 2020). https://en.wikipedia.org/wiki/Image-based_modeling_and_rendering.
(Continued)

*Primary Examiner* — Anh-Tuan V Nguyen
(74) *Attorney, Agent, or Firm* — Farjami & Farjami LLP

(57) ABSTRACT

An image processing system includes a computing platform having processing hardware, a display, and a system memory storing a software code. The processing hardware is configured to execute the software code to receive a three-dimensional (3D) digital model, surround the 3D digital model with multiple virtual cameras oriented toward the 3D digital model, and generate, using the virtual cameras, a multiple renders of the 3D digital model. The processing hardware is further configured to execute the software code to generate a UV texture coordinate space for a surface projection of the 3D digital model, and to transfer, using the multiple renders, lighting color values for each of multiple surface portions of the 3D digital model to the UV texture coordinate space.

22 Claims, 7 Drawing Sheets

(51) Int. Cl.
*G06T 15/50* (2011.01)
*G06T 17/20* (2006.01)
*H04N 13/275* (2018.01)
*H04N 13/282* (2018.01)

(52) U.S. Cl.
CPC ......... *H04N 13/275* (2018.05); *H04N 13/282* (2018.05)

(56) References Cited

U.S. PATENT DOCUMENTS

| | | | |
|---|---|---|---|
| 2004/0164992 A1* | 8/2004 | Gangnet | G06T 11/001 345/591 |
| 2006/0017722 A1* | 1/2006 | Hong | G06T 15/04 345/582 |
| 2006/0284880 A1* | 12/2006 | Zhou | G06T 15/04 345/582 |
| 2009/0027391 A1* | 1/2009 | Burley | G06T 15/506 345/426 |
| 2010/0097375 A1* | 4/2010 | Tadaishi | A63F 13/63 345/420 |
| 2011/0050691 A1* | 3/2011 | Hamedi | G06T 19/20 345/426 |
| 2011/0254841 A1* | 10/2011 | Lim | G06T 17/20 345/421 |
| 2014/0267307 A1* | 9/2014 | Liou | G06T 15/20 345/473 |
| 2016/0012643 A1* | 1/2016 | Kezele | H04N 13/344 345/633 |
| 2016/0104309 A1* | 4/2016 | Kim | G06V 40/171 382/118 |
| 2016/0155261 A1* | 6/2016 | Iborra | G06T 15/04 345/426 |
| 2016/0307368 A1* | 10/2016 | Akeley | G06T 9/00 |
| 2016/0328861 A1* | 11/2016 | Shavit | G06T 19/20 |
| 2017/0053431 A1* | 2/2017 | Grenfell | G06T 15/04 |
| 2017/0358133 A1* | 12/2017 | Iverson | G06T 17/205 |
| 2018/0101978 A1* | 4/2018 | Hirota | G06T 15/04 |
| 2018/0268609 A1* | 9/2018 | Schneider | G06F 3/04815 |
| 2018/0300848 A1* | 10/2018 | Kuzyakov | G06T 3/0087 |
| 2019/0043253 A1* | 2/2019 | Lucas | G06T 9/001 |
| 2019/0102936 A1* | 4/2019 | Neulander | G06T 15/04 |
| 2019/0272346 A1* | 9/2019 | Weeger | B33Y 80/00 |
| 2020/0273247 A1* | 8/2020 | Lim | G06V 10/10 |
| 2020/0280710 A1* | 9/2020 | Vosoughi | H04N 19/54 |
| 2022/0349830 A1* | 11/2022 | Hong | G06V 20/647 |

OTHER PUBLICATIONS

"Sustainability of Digital Formats: Planning for Library of Congress Collections" Polynomial Texture Map (PTM) File Format. The Wayback Machine. 6 Pgs, [2018].

"UV Mapping" Wikipedia https://en.wikipedia.org/wiki/UL_mapping 3 Pgs, [2020].

Wolfgang Niem, Hellward Broszio "Mapping Texture From Multiple Camera Views Onto 3D-Object Models for Computer Animation" University of Hanover Institute for Theoretical Communications Engineering and Information Processing 7 Pgs, [1995].

Extended European Search Report dated Sep. 2, 2022 for EP Application 22159068.0. 8 Pgs.

\* cited by examiner

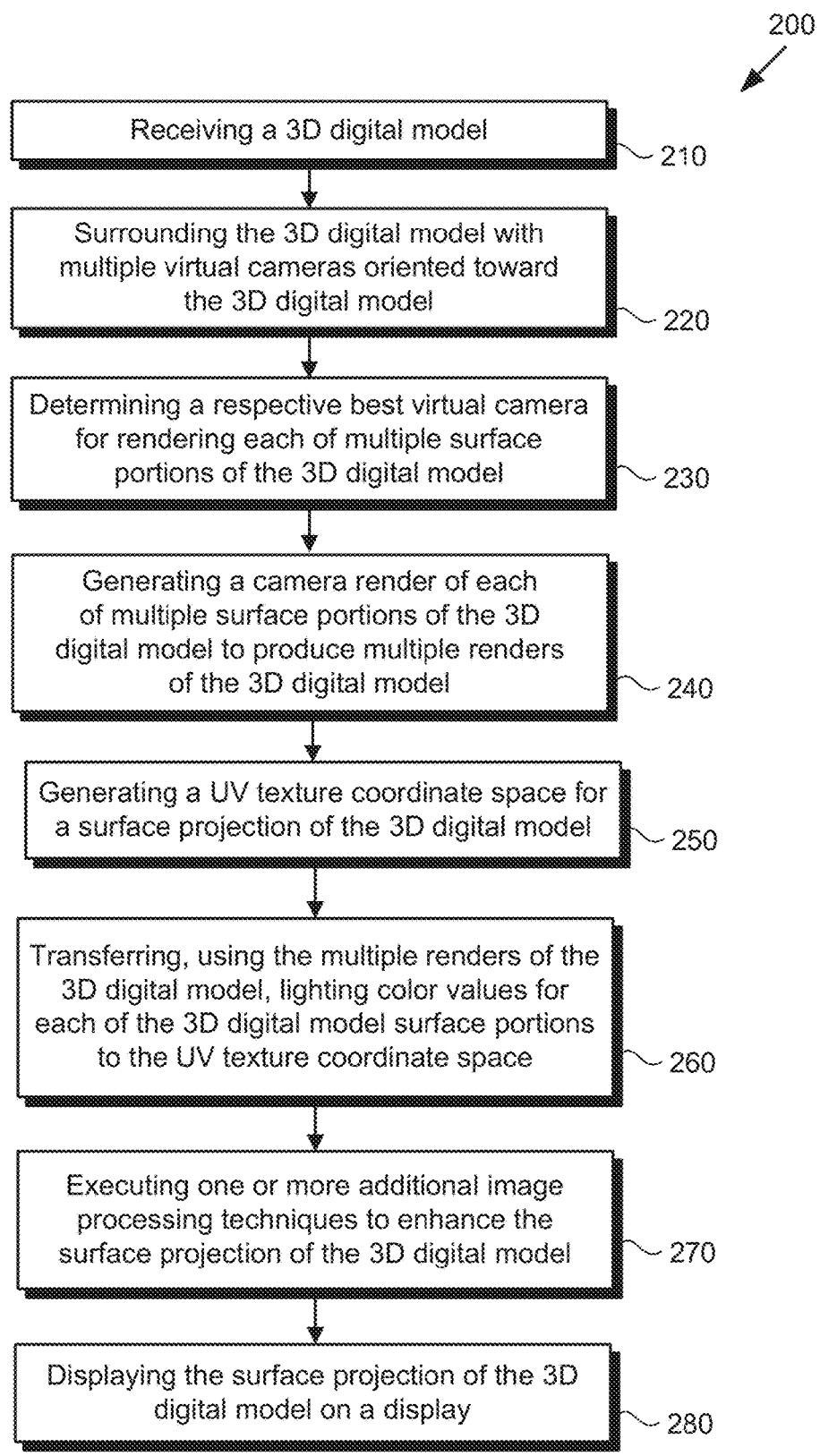

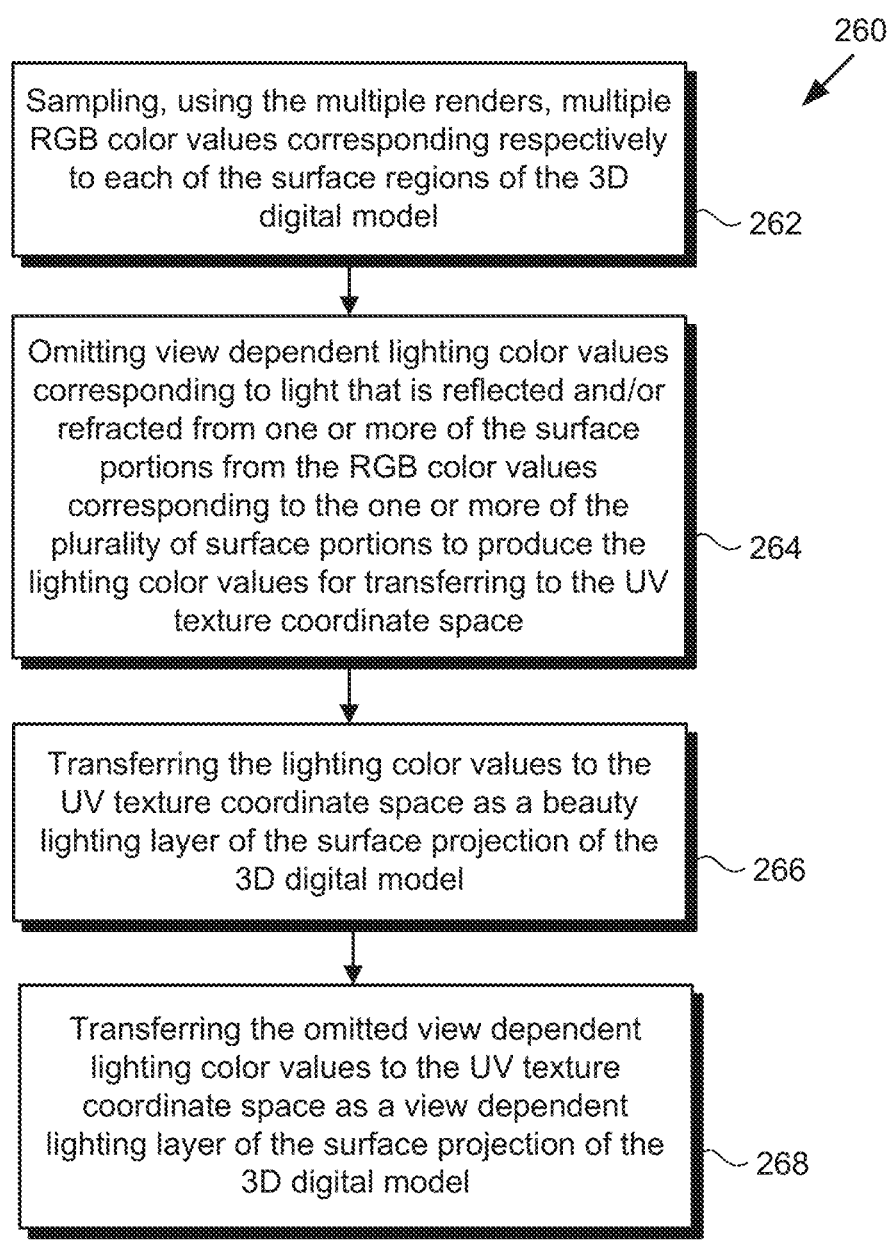

3D DIGITAL MODEL SURFACE RENDERING AND CONVERSION

BACKGROUND

The process for creating and rendering the types of three-dimensional (3D) digital assets used in content production is complicated and very often proprietary to the studio producing the asset. Complex custom pipelines that involve many steps and the participation of many artists are typically needed to generate the final image render. Production tools and shaders are developed in-house. Even entirely proprietary renderer engines, which are functional only in the specific pipeline of a particular studio, may be used to produce the final render of the asset. Moreover, a production pipeline within the same studio typically evolves to meet the needs of each new production project. Therefore, an asset produced using a legacy version of a particular pipeline may not be compatible with that pipeline in its evolved form.

For the foregoing reasons, interoperability of 3D digital assets among studios, or among different pipeline versions in the same studio can be a difficult and often labor intensive process. Additionally, taking an off-line rendered digital asset and recreating an accurate representation of it in a real-time game engine pipeline presents further difficulties. In many cases the original model, shaders, and renders can only be used for visual reference, and the asset must be entirely recreated in a manual process. Due to its intense reliance on human participation, this manual re-modeling, re-texturing, and re-shading is both undesirably costly and time consuming. It also risks a result that does not accurately match the original art direction, as simplifications may be required and some aspects are only generated at render-time, such as displacement maps that offset the surface of a mesh thereby changing its shape, and procedural geometries that are generated with code as opposed to being created externally and loaded, to name merely two examples. Consequently, there is a need in the art for a solution for converting high complexity digital assets produced by a particular studio or using a particular pipeline so as to be interoperable with other studios, pipelines, and platforms.

BRIEF DESCRIPTION OF THE DRAWINGS

FIG. 2A shows a flowchart presenting an exemplary method for performing 3D digital model surface rendering and conversion, according to one implementation;

FIG. 2B shows a flowchart outlining an intermediate action in the flowchart shown in FIG. 2A, in greater detail, according to one implementation;

DETAILED DESCRIPTION

Figure 1:
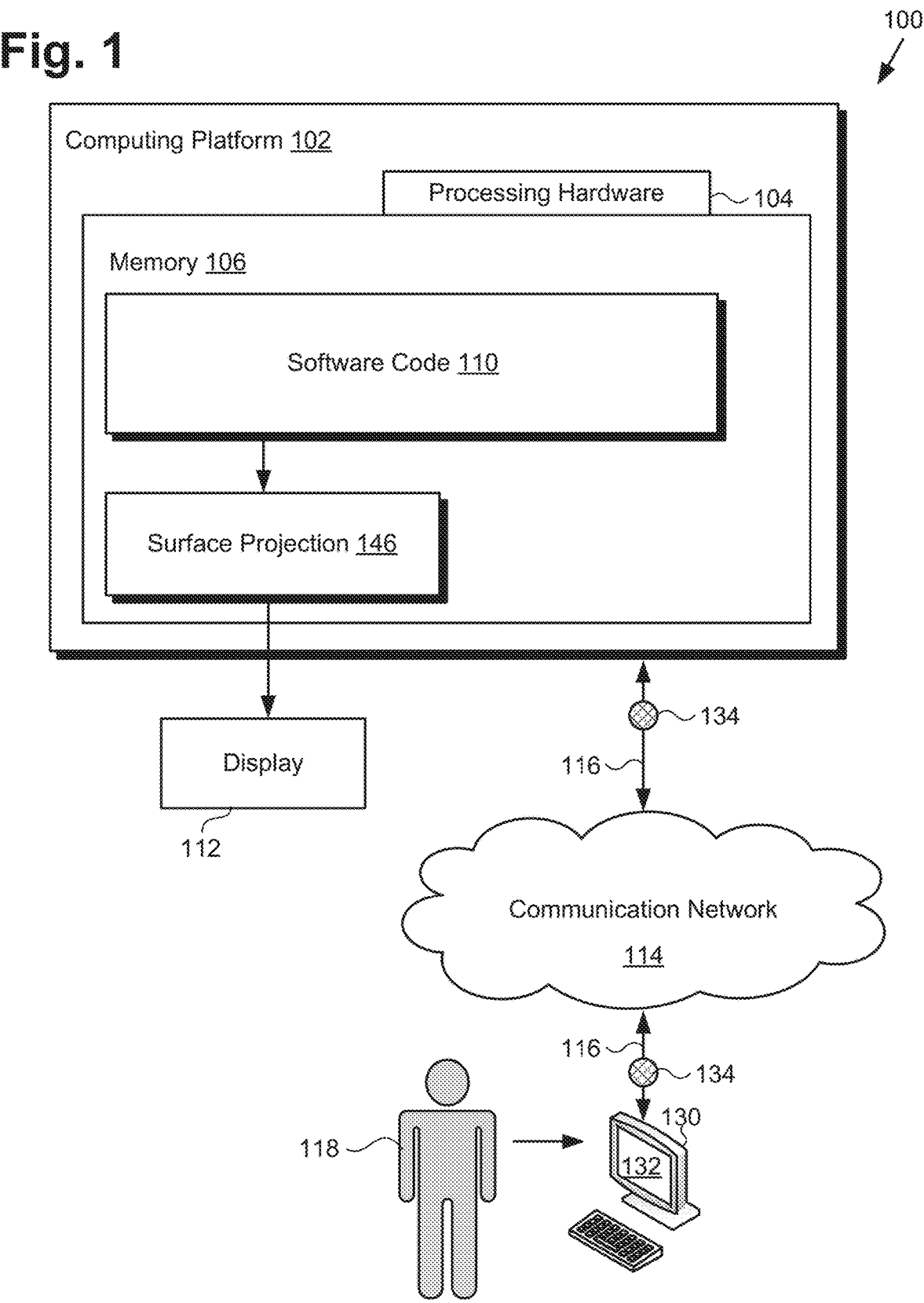
FIG. 1 shows a diagram of an exemplary image processing system for performing three-dimensional (3D) digital model surface rendering and conversion, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses systems and methods for performing three-dimensional (3D) digital model surface rendering and conversion that overcome the drawbacks and deficiencies in the conventional an. The solution disclosed in the present application enables the automated conversion of a large portion of the information that captures the appearance of a high complexity rendered 3D digital model to a flexible, pipeline agnostic format that that allows the converted model to be interoperable among different pipelines and studios. It is noted that, as used herein, the expression "high complexity," when used to describe a digital object, such as a 3D digital model for example, refers to a digital object of such extensive detail that it cannot be rendered fast enough for use in real-time applications. It is further noted that, as used herein, the expression "pipeline agnostic," when used to describe a feature, refers to a feature that is not limited to use with a specific pipeline architecture, but may be used and processed in several or substantially all of the different pipelines utilized by various studios.

The pipeline agnostic format is easily scalable so that the data describing the converted model can be represented at the full original resolution or a reduced representation that compresses the large set of data available from the original high complexity 3D digital model. The present solution advantageously captures and converts lighting information of the scene as well as non-lighting specific information such as normal, ambient occlusion, and the original UV texture coordinates of the 3D digital model. Thus, the present solution improves on present state-of-the-art light baking techniques by capturing many layers of information about the rendered 3D digital model beyond merely lighting contributions.

It is noted that, as used in the present application, the terms "automation," "automated," and "automating" refer to systems and processes that do not require human intervention. Although, in some implementations, a human artist or editor may review or even modify a surface projection of a 3D digital object produced by the systems described herein, that human involvement is optional. Thus, in some implementations, the methods for performing 3D digital model surface rendering and conversion described in the present application may be performed under the control of hardware processing components executing them.

FIG. 1 shows a diagram of an exemplary image processing system for performing 3D digital model surface rendering and conversion, according to one implementation. As shown in FIG. 1, image processing system 100 includes computing platform 102 having processing hardware 104, display 112, and system memory 106 implemented as a computer-readable non-transitory storage medium. As further shown in FIG. 1, image processing system 100 may exist in a use environment including communication network 114, workstation terminal 130 including display 132, and artist or user 118 (hereinafter "user 118") utilizing workstation terminal 130. Also shown in FIG. 1 are 3D digital model 134, software code 110, and surface projection 146 of 3D digital model 134 (hereinafter "surface projection 146") produced by software code 110, as well as network communication links 116 interactively connecting workstation terminal 130 and image processing system 100 via communication network 114.

It is further noted that although software code 110 and surface projection 146 are depicted as being stored in system memory 106, more generally, system memory 106 may take the form of any computer-readable non-transitory storage medium. The expression "computer-readable non-transitory storage medium." as used in the present application, refers to any medium, excluding a carrier wave or other transitory signal that provides instructions to a hardware processor of a computing platform, such as processing hardware 104 of computing platform 102. Thus, a computer-readable non-transitory storage medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory storage media include, for example, optical discs. RAM, programmable read-only memory (PROM), erasable PROM (EPROM), and FLASH memory.

Moreover, although FIG. 1 depicts software code 110 and surface projection 146 as being located together in system memory 106 that representation is also merely provided as an aid to conceptual clarity. More generally, image processing system 100 may include one or more computing platforms, such as computer servers for example, which may be co-located, or may form an interactively linked but distributed system, such as a cloud-based system, for instance. As a result, processing hardware 104 and system memory 106 may correspond to distributed processor and memory resources within image processing system 100. Thus, it is to be understood that in some implementations, software code 110 and surface projection 146 may be stored remotely from one another within the distributed memory resources of image processing system 100. It is also noted that although FIG. 1 depicts surface projection 146 as residing in system memory 106, in some implementations, surface projection 146 may be copied to non-volatile storage.

Processing hardware 104 may include multiple hardware processing units, such as one or more central processing units, one or more graphics processing units, and one or more tensor processing units. By way of definition, as used in the present application, the terms "central processing unit" (CPU), "graphics processing unit" (GPU), and "tensor processing unit" (TPU) have their customary meaning in the art. That is to say, a CPU includes an Arithmetic Logic Unit (ALU) for carrying out the arithmetic and logical operations of computing platform 102, as well as a Control Unit (CU) for retrieving programs, such as software code 110, from system memory 106, while a GPU may be implemented to reduce the processing overhead of the CPU by performing computationally intensive graphics or other processing tasks. A TPU is an application-specific integrated circuit (ASIC) configured specifically for artificial intelligence (AI) processes such as machine learning.

In some implementations, computing platform 102 may correspond to one or more web servers, accessible over a packet-switched network such as the Internet, for example. Alternatively, computing platform 102 may correspond to one or more computer servers supporting a private wide area network (WAN), local area network (LAN), or included in another type of limited distribution or private network. Moreover, in some implementations, communication network 114 may be a high-speed network suitable for high performance computing (HPC), for example a 10 GigE network or an Infiniband network.

Although workstation terminal 130 is shown as a desktop computer in FIG. 1, that representation is provided merely as an example as well. More generally, workstation terminal 130 may be any suitable mobile or stationary computing device or system that includes display 132 and implements data processing capabilities sufficient to implement the functionality ascribed to workstation terminal 130 herein. For example, in other implementations, workstation terminal 130 may take the form of a laptop computer, tablet computer, or smartphone, for example. Moreover, in some implementations, workstation terminal 130 may be a dumb terminal existing as a peripheral feature of image processing system 100. In those latter implementations, display 132 of workstation terminal 130 may be controlled by processing hardware 104 and software code 110 of computing platform 102.

With respect to display 112 of image processing system 100 and display 132 of workstation terminal 130, displays 112 and 132 may be implemented as liquid crystal displays (LCDs), light-emitting diode (LED) displays, organic light-emitting diode (OLED) displays, quantum dot (QD) displays, or any other suitable display screens that perform a physical transformation of signals to light. Furthermore, display 132 may be physically integrated with workstation terminal 130 or may be communicatively coupled to but physically separate from workstation terminal 130. For example, where workstation terminal 130 is implemented as a smartphone, laptop computer, or tablet computer, display 132 will typically be integrated with workstation terminal 130. By contrast, where workstation terminal 130 is implemented as a desktop computer, display 132 may take the form of a monitor separate from workstation terminal 130 in the form of a computer tower.

Figure 2C:
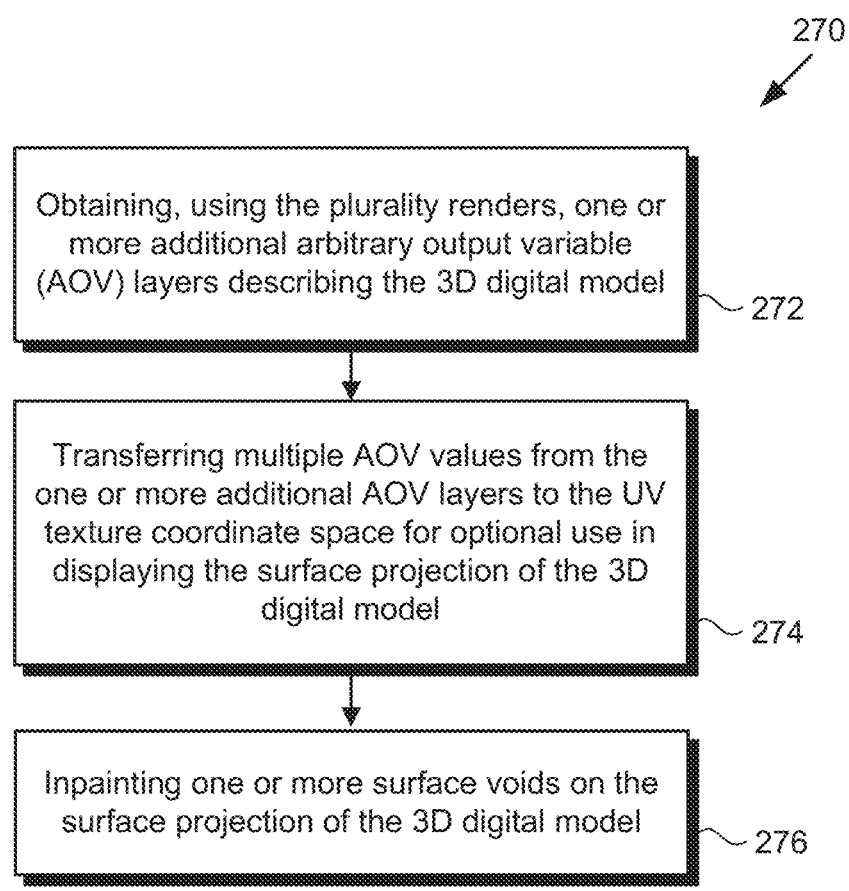
FIG. 2C shows a flowchart outlining another intermediate action in the flowchart shown in FIG. 2A, in greater detail, according to one implementation.
Figure 3:
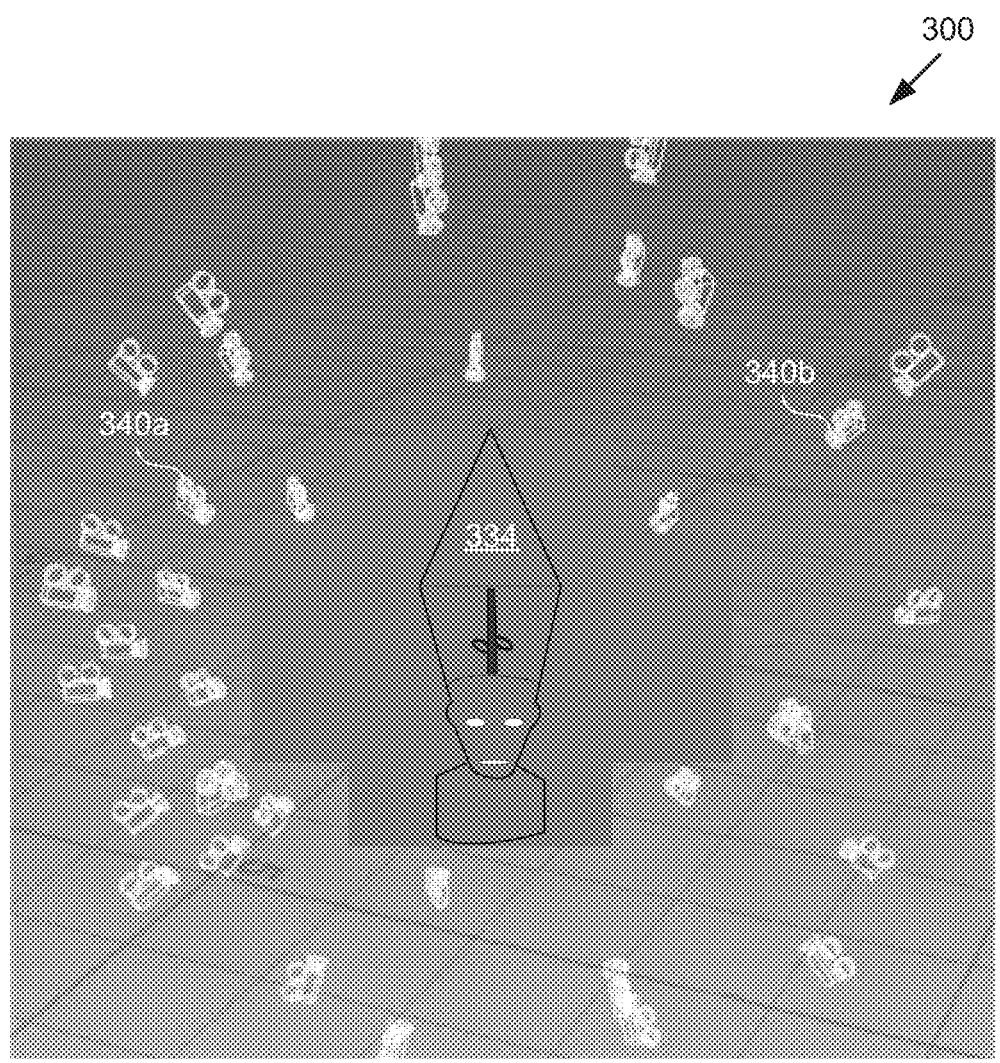
FIG. 3 depicts yet another intermediate action in the flowchart shown in FIG. 2A, according to one implementation.
Figure 4:
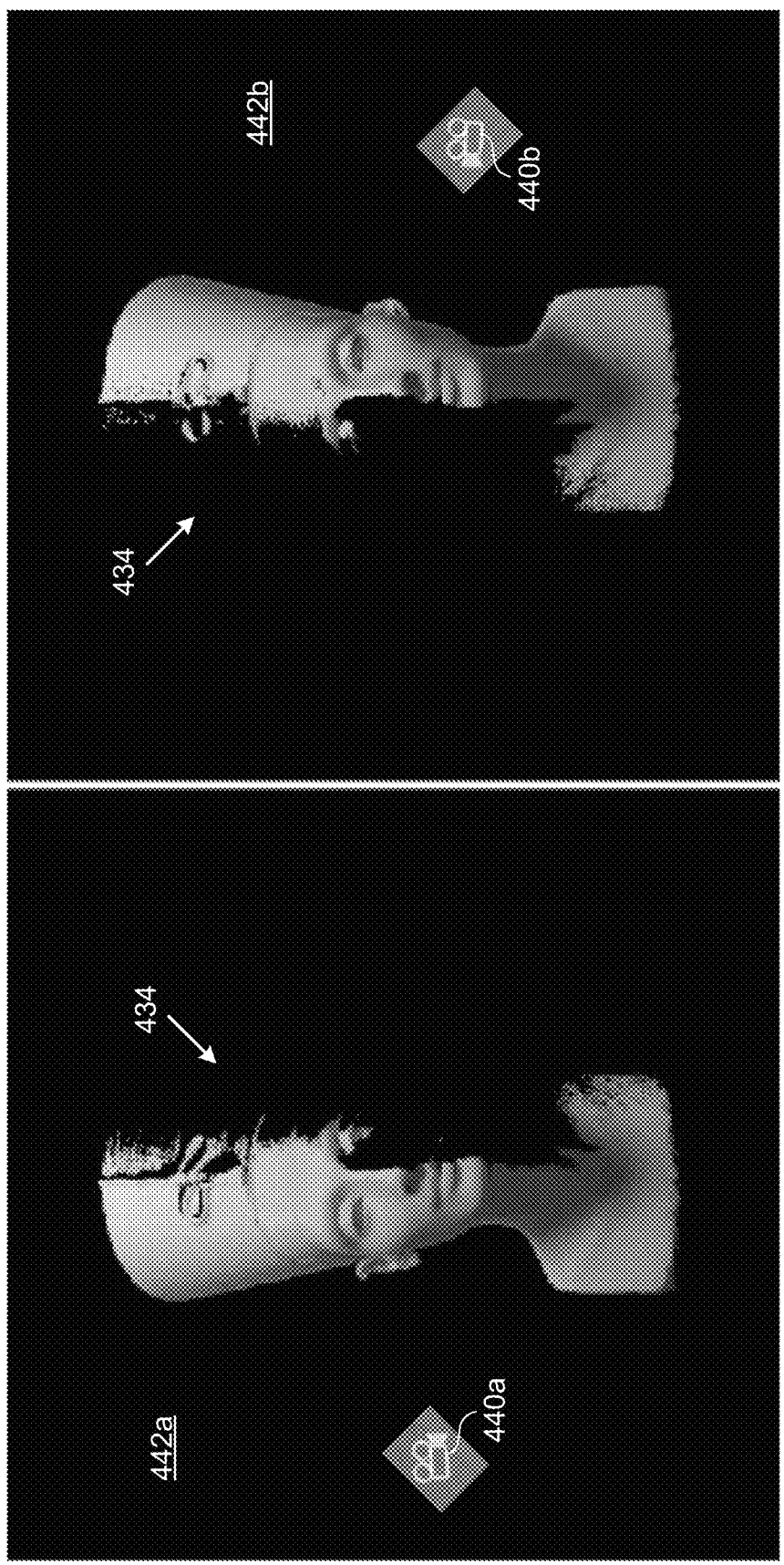
FIG. 4 depicts another intermediate action in the flowchart shown in FIG. 2A, according to one implementation.
Figure 5:
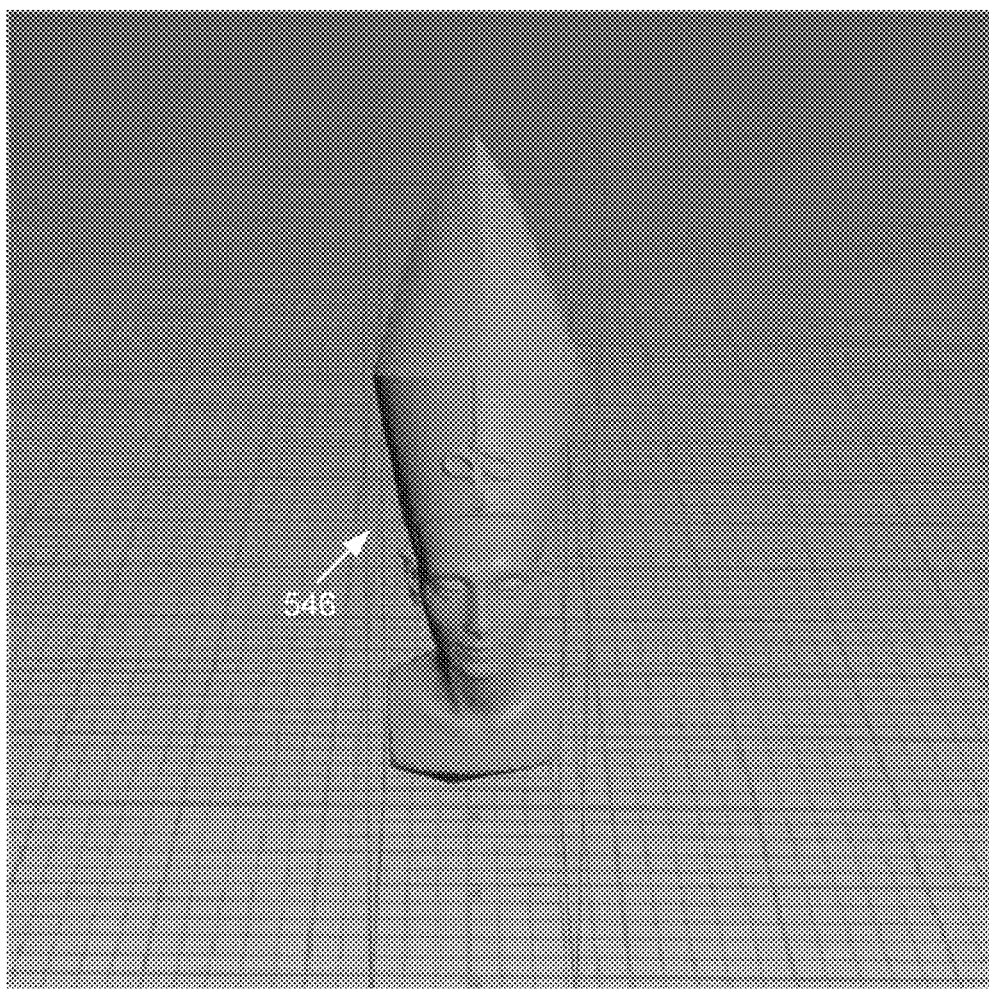
FIG. 5 shows an exemplary surface projection of a 3D digital model, according to one implementation.

The functionality of software code 110 will be further described by reference to FIG. 2A in combination with FIGS. 1, 2B, 2C, 3, 4, and 5. FIG. 2A shows flowchart 200 presenting an exemplary method for performing 3D digital model surface rendering and conversion, according to one implementation, while FIGS. 3 and 4 depict exemplary intermediate actions included in flowchart 200, and FIG. 5 shows an exemplary surface projection of a 3D digital model, according to one implementation. FIG. 2B shows a flowchart outlining action 260 in flowchart 200 in greater detail, according to one implementation, while FIG. 2C shows a flowchart outlining action 270 in greater detail, according to one implementation.

With respect to the method described by FIGS. 2A, 2B, and 2C, by way of overview, it is noted that in the interests of optimal interoperability the present method relies solely on rendered images of 3D digital model 134. Thus there is no need to export and convert complex shader networks or to ingest and translate model textures manually. As discussed below, the present method works by generating a set of virtual cameras surrounding 3D digital model 134. Each of the virtual cameras is then rendered and projected back onto a 3D mesh representing 3D digital model 134, resulting in surface projection 146. By projecting the renders in this way, all of the information stored in the renders can be captured on surface projection 146 of 3D digital model 134. Because all studio visual effects (VFX) pipelines, for example, produce image sequences as their end result, this makes for easy interoperability between all VFX studios and is agnostic to their specific pipelines. Any VFX studio can produce a sequence of images for the given cameras using their existing pipeline rather than having to conform to a specific import/export format.

Referring now to FIG. 2A in combination with FIG. 1, flowchart 200 begins with receiving 3D digital model 134 (action 210), 3D digital model 134 may be a high complexity 3D model of a human being, character, animal, inanimate object, or may depict a scene including multiple digital objects. 3D digital model 134 may be represented by a mesh having a mesh element count in the millions, or tens of millions. As a specific example, in one implementation, 3D digital model 134 may be a VFX digital asset created for use in a feature film. It is noted that, as defined in the present application, the feature "mesh element count" refers to the number of individual surface components included in a surface conforming mesh representation. Thus, by way of example, the mesh element count of a triangle mesh is its triangle count, while the mesh element count of a more generalized polygon mesh is its polygon count.

As shown in FIG. 1, in some implementations, 3D digital model 134 may be received from user 118 via workstation terminal 130, communication network 114, and network communication links 116. In other implementations, 3D digital model 134 may be stored in system memory 106 and may be received in action 210 as a data transfer within system memory 106, 3D digital model 134 may be received in action 210 by software code 110, executed by processing hardware 104 of computing platform 102.

Flowchart 200 further includes surrounding 3D digital model 134 with multiple virtual cameras oriented toward 3D digital model 134 (action 220). As noted above, 3D digital model 134 may be a high complexity 3D model of a human being, character, animal, or inanimate object. As shown in FIG. 3, for example, in some use cases 3D digital model 334 may take the form of a 3D sculpted bust. It is noted that 3D digital model 334 corresponds in general to 3D digital model 134, in FIG. 1, and those corresponding features may share any of the characteristics attributed to either feature by the present disclosure. That is to say, like 3D digital model 134, 3D digital model 334 may be represented by a mesh having a mesh element count in the millions, or tens of millions. As a specific example, in one implementation, 3D digital model 334 may be a film quality VFX digital asset.

As further shown in FIG. 3, in some implementations, action 220 may include generating a two-dimensional (2D) closed surface, such as a sphere for example, surrounding 3D digital model 134/334, and situating multiple virtual cameras corresponding to exemplary virtual cameras 340a and 340b on that 2D closed surface. Alternatively, virtual cameras 340a and 340b may be placed on any one or more 2D closed surfaces surrounding 3D digital model 134/334 and having shapes that are not limited to spheres. An exemplary technique for surrounding 3D digital model 134 with multiple virtual cameras is described in U.S. patent application Ser. No. 17/211,724, filed on Mar. 24, 2021, and titled "Volumetric Representation of Digital Objects from Depth Renderings," which is hereby incorporated fully by reference into the present application.

It is noted that action 220 includes surrounding 3D digital model 134/334 by a sufficient number of virtual cameras having locations such that substantially all external feature of 3D digital model 134/334 can be captured by at least one of the virtual cameras, i.e., substantially the entire external surface of 3D digital model 134/334 may be viewed or mapped by the multiple virtual cameras surrounding 3D digital model 134/334. Thus, although FIG. 3 explicitly identifies two virtual cameras 340a and 340b, more generally virtual cameras 340a and 340b may correspond to tens or hundreds of virtual cameras each located so as to have a unique perspective of 3D digital model 134/334. Moreover virtual cameras 340a and 340b may be implemented using a variety of different camera configurations and lens parameters, such as different focal lengths. For example in one implementation, virtual cameras 340a and 340b may take the form of panoramic cameras. Action 220 may be performed by software code 110, executed by processing hardware 104 of computing platform 102.

In some implementations, flowchart 200 may further include determining a best virtual camera among virtual cameras 340a and 340b for rendering each of multiple surface portions of 3D digital model 134/334 (action 230). Referring to FIG. 4, FIG. 4 shows virtual camera 440a having perspective 442a of 3D digital model 434 and virtual camera 440b having another perspective 442b of 3D digital model 434. It is noted that 3D digital model 434 corresponds in general to 3D digital model 134/334, in FIGS. 1 and 3. Thus, 3D digital model 434 may share any of the characteristics attributed to 3D digital model 134/334 by the present disclosure, and vice versa. Moreover, virtual cameras 440a and 440b, in FIG. 4, correspond respectively in general to virtual cameras 340a and 340b, in FIG. 3, and those corresponding features may share any of the characteristics attributed to either corresponding feature by the present disclosure. In other words, like virtual cameras 340a and 340b, virtual cameras 440a and 440b may correspond to tens or hundreds of virtual cameras each located so as to have a unique perspective of 3D digital model 134/334/434.

Because there are many virtual cameras 340a/440a and 340b/440b surrounding 3D digital model 134/334/434, a given surface portion of 3D digital model 134/334/434 may be viewed by more than one of virtual cameras 340a/440a and 340b/440b. As a result, in some implementations, a determination of the "best" virtual camera to use in rendering each surface portion of 3D digital model 134/334/434 may be made. In some implementations, it may be advantageous or desirable to utilize a metric to make such a determination based on one or both of two factors: 1) the pixel density on a particular surface portion from the perspective of a given virtual camera, and 2) a measure of how perpendicular the camera lens is to a normal vector of that surface portion. That is to say, the respective best virtual camera for rendering each surface portion of 3D digital model 134/334/434 may be determined based on at least one of a pixel density of each of the surface portions from the perspective of the respective best virtual camera or a lens orientation of the respective best virtual camera relative to an axis perpendicular to each of the surface portions. In some implementations, for example, the determination may be made using a weighted combination of these two factors. Action 230 may be performed by software code 110, executed by processing hardware 104 of computing platform 102.

Flowchart 200 further includes generating, using each of virtual cameras 340a/440a and 340b/440b, a respective render of 3D digital model 134/334/434, resulting in multiple renders of 3D digital model 134/334/434 (action 240). In implementations in which the method outlined by flowchart 200 includes determining a best camera for each surface portion of 3D digital model 134/334/434 in action 230, generating the multiple renders of 3D digital model 134/334/434 in action 240 may include rendering each surface portion using the respective best virtual camera determined for that surface portion. In implementations in which action 230 is omitted from the method outlined by flowchart 200, action 240 results in substantially all surface portions of 3D digital model 134/334/434 being included in at least one of the multiple renders of 3D digital model 134/334/434. Action 240 may be performed by software code 110, executed by processing hardware 104 of computing platform 102. It is noted that, in some implementations, action 240 may follow directly from action 220, while action 230 may be omitted. However, in other implementations, action 240 may follow action 230, which may follow action 220, as shown in FIG. 2A.

Flowchart 200 further includes generating a UV texture coordinate space for surface projection 146 of 3D digital model 134/334/434 (action 250). As known in the art, a UV texture coordinate space may be utilized to store a 2D image that is mapped to a 3D surface shape. Such a UV texture coordinate space can be generated using traditional texture coordinate seaming and packing algorithms known in the art. It is noted that, in some implementations, multiple UV texture coordinate spaces can be generated to increase the pixel density of surface projection 146, as desired. By using renders from virtual cameras that are positioned closer or further away from 3D digital model 134/334/434, the final resolution of surface projection 146 can be adjusted to be higher or lower accordingly. Action 250 may be performed by software code 110, executed by processing hardware 104 of computing platform 102.

Flowchart 200 further includes transferring, using the multiple renders generated in action 240, lighting color values for each of the multiple surface portions of 3D digital model 134/334/434 to the UV texture coordinate space generated in action 250 (action 260). Referring to FIG. 2B, as noted above, FIG. 2B shows a flowchart outlining action 260 in greater detail. It is noted that action 260, which may include actions 262, 264, 266, and 268, may be performed by software code 110, executed by processing hardware 104 of computing platform 102.

As shown in FIG. 2B, action 260 may include sampling, using the multiple renders, red-green-blue (RGB) color values corresponding respectively to each of the multiple surface portions of 3D digital model 134/334/434 (action 262). Action 260 may further include omitting view dependent lighting color values corresponding to light that is one or both of reflected or refracted from one or more of the surface portions of 3D digital model 134/334/434 from the RGB color values sampled in action 262, to produce the lighting color values for transferring to the UV texture coordinate space (action 264). Thus, the lighting color values transferred to the UV texture coordinate space in action 260 may be view independent lighting color values. It is noted that without the omission of view dependent lighting color values in action 264 there would typically be undesirable visible seams in surface projection 146 as the lighting color changes depending on the respective locations of virtual cameras 340a/440 and 340b/440b.

As further shown in FIG. 2B, in some implementations, action 260 may include transferring the view independent lighting color values produced in action 264 to the UV texture coordinate space generated in action 250 as a beauty lighting layer that stores the final fully lit pixel rendering of surface projection 146 (action 266). Moreover, in some implementations, action 260 may further include transferring the omitted view dependent lighting color values to the UV texture coordinate space as a view dependent lighting layer of surface projection 146 (action 268). It is noted that, in some implementations, action 260 may conclude with action 266 and action 268 may be omitted. Moreover, in some implementations in which action 268 is performed, action 266 and 268 may be performed in parallel, i.e., substantially concurrently.

Referring back to FIG. 2A, in some implementations, the method outlined by flowchart 200 may conclude with action 260 described above. However, in other implementations, flowchart 200 may continue and conclude with executing one or more additional image processing techniques to enhance surface projection 146 of 3D digital model 134/334/434 (action 270). Referring to FIG. 2C, as noted above. FIG. 2C shows a flowchart outlining action 270 in greater detail. It is noted that action 270, which may include actions 272, 274, and 276, may be performed by software code 110, executed by processing hardware 104 of computing platform 102.

In addition to the lighting color values transferred in action 260, any data that can be output from the renders as an arbitrary output variable (AOV) layer can be transferred into the UV texture coordinate space generated in action 250. Consequently, and as shown in FIG. 2C, action 270 may include obtaining, using the renders generated in action 240, one or more additional output AOV layers describing 3D digital model 134/334/434 action (372), and transferring AOV values from the one or more additional AOV layers to the UV texture coordinate space for optional use in displaying surface projection 146 (action 374).

The additional one or more AOV layers may include one or both of an ambient occlusion layer that stores data describing how exposed each position on the surface of 3D digital model 134/334/434 is, and a normal vector layer that stores the surface orientation of each position on the surface of 3D digital model 134/334/434 in 3D space, for example, each of which is very useful when re-lighting 3D digital model 134/334/434 in a new pipeline. Alternatively, or additionally, the one or more additional AOV layers may include a layer identifying the UV texture coordinates of the 3D digital model 134/334/434. That is to say, in some implementations, the AOV values transferred to the UV texture coordinate space for surface projection 146 may include the UV texture coordinates of original 3D digital model 134/334/434.

Using the additional AOV layer including the UV texture coordinates of 3D digital model 134/334/434 it is possible to obtain "warp textures" that enable warping of the original 3D digital model material textures into the UV coordinate texture space for surface projection 146. In this way, hundreds of 4K texture images can be resampled into a single or several images. Warping the original material textures of 3D digital model 134/334/434 advantageously allows for a significant reduction/compression of the original data describing 3D digital model 134/334/434 in an automated way. The new textures can be used to re-light the 3D digital model in a variety of different render pipelines so as to be accurate to original 3D digital model 134/334/434 because they utilize the original material textures of 3D digital model 134/334/434.

One limitation of the actions described above is that although substantially the entire external surface of 3D digital model 134/334/434 may be viewed or mapped by the multiple virtual cameras surrounding 3D digital model 134/334/434, nevertheless there are typically small areas of 3D digital model 134/334/434 that are not covered by any of the virtual camera renders. In such areas, there is a void of data, which results in small empty or black holes (hereinafter "surface voids") on surface projection 146 that can detract from the final result. As a result, in some implementations, action 270 may include inpainting one or more surface voids present on surface projection 146 (action 276). Machine learning based inpainting techniques can be used to fill these surface voids with new data, or non-machine learning interpolation techniques can be used, based on average color from surrounding pixels, for example. In one implementation, for example, inpainting of each of the one or more surface voids may be performed using a non-machine learning partial differential equation (PDE) interpolation technique based on one or more lighting color values at pixels of surface projection 146 at a boundary of each of the one or more surface voids.

It is noted that, in some implementations, action 270 may include action 272 and 274, while omitting action 276. However, in other implementations, action 270 may omit action 272 and 274, but include action 276. It is further noted that in some implementations, action 270 may be omitted entirely. In those implementations, subsequent action 280, described below, may follow directly from action 260.

Although, as noted above, in various implementations the method outlined by flowchart 200 may conclude with action 260, or with action 270, in some implementations, flowchart 200 may continue and conclude with displaying surface projection 146 of 3D digital model 134/334/434 on display 112, or on display 132 of workstation terminal 130 (action 280). That is to say, in some implementations action 280 may follow action 260 and action 270 may be omitted, while in other implementations action 270 may follow action 260 and precede action 280. One or both of the view independent lighting color values and the view dependent color values identified in action 264, as well as the one or more of the AOV values transferred to the UV texture coordinate space for surface projection 146 in action 274 may be used to display surface projection 146 of 3D digital model 134/334/434 on the display 112 or 132.

Action 280 may be performed by software code 110, executed by processing hardware 104 of computing platform 102. For example, as noted above, in some implementations, workstation terminal 130 may be a dumb terminal existing as a peripheral feature of image processing system 100. In those latter implementations, display 132 of workstation terminal 130 may be controlled by software code 110 and processing hardware 104.

Referring to FIG. 5. FIG. 5 shows exemplary surface projection 546 of 3D digital model 134/334/434, according to one implementation. Surface projection 546 corresponds in general to surface projection 146, in FIG. 1. Thus, surface projection 146 may share any of the characteristics attributed to corresponding surface projection 546 by the present disclosure, and vice versa. It is noted that surface projection 146/546 may take the form of a mesh representation of 3D digital model 134/334/434 having a reduced mesh element count relative to the original high complexity 3D digital model 134/334/434. For example as noted above, 3D digital model 134/334/434 may be represented by a mesh having a mesh element count in the millions, or tens of millions. By contrast, the mesh representation of surface projection 146/546 of 3D digital model 134/334/434 may have a mesh element count that is at least an order of magnitude less, i.e., a factor of ten less, than the mesh element count of the mesh representative of 3D digital model 134/334/434.

With respect to the actions outlined by FIGS. 2A, 2B, and 2C, it is emphasized that actions 210, 220, 240, 250, and 260 including actions 262, 264, and 266, or actions 210, 220, 240, 250, and 260 including actions 262, 264, 266, and 268, or actions 210, 220, 230, 240, 250, and 260 including actions 262, 264, and 266, or actions 210, 220, 230, 240, 250, and 260 including actions 262, 264, 266, and 268, or actions 210, 220, 240, 250, 260 including actions 262, 264, and 266, and action 280, or actions 210, 220, 240, 250, 260 including actions 262, 264, 266, and 268, and action 280, or actions 210, 220, 230, 240, 250, 260 including actions 262, 264, and 266, and action 280, or actions 210, 220, 230, 240, 250, 260 including actions 262, 264, 266, and 268, and action 280, or actions 210, 220, 240, 250, 260 including actions 262, 264, and 266, and action 270 including actions 272 and 274, or actions 210, 220, 240, 250, 260 including actions 262, 264, 266, and 268, and action 270 including actions 272 and 274, or actions 210, 220, 240, 250, 260 including actions 262, 264, and 266, and action 270 including actions 272, 274, and 276, or actions 210, 220, 240, 250, 260 including actions 262, 264, 266, and 268, and action 270 including actions 272, 274, and 276, or actions 210, 220, 230, 240, 250, 260 including actions 262, 264, and 266, and action 270 including actions 272 and 274, or actions 210, 220, 230, 240, 250, 260 including actions 262, 264, 266, and 268, and action 270 including actions 272 and 274, or actions 210, 220, 230, 240, 250, 260 including actions 262, 264, and 266, and action 270 including actions 272, 274, and 276, or actions 210, 220, 230, 240, 250, 260 including actions 262, 264, 266, and 268, and action 270 including actions 272, 274, and 276, or actions 210, 220, 240, 250, 260 including actions 262, 264, and 266, and action 270 including actions 272 and 274, and action 280, or actions 210, 220, 240, 250, 260 including actions 262, 264, 266, and 268, and action 270 including actions 272 and 274, and action 280, or actions 210, 220, 240, 250, 260 including actions 262, 264, and 266, and action 270 including actions 272, 274, and 276, and action 280, or actions 210, 220, 240, 250, 260 including actions 262, 264, 266, and 268, and action 270 including actions 272, 274, and 276, and action 280, or actions 210, 220, 230, 240, 250, 260 including actions 262, 264, and 266, and action 270 including actions 272 and 274, and action 280, or actions 210, 220, 230, 240, 250, 260 including actions 262, 264, 266, and 268, and action 270 including actions 272 and 274, and action 280, or actions 210, 220, 230, 240, 250, 260 including actions 262, 264, and 266, and action 270 including actions 272, 274, and 276, and action 280, or actions 210, 220, 230, 240, 250, 260 including actions 262, 264, 266, and 268, and action 270 including actions 272, 274, and 276, and action 280 may be performed in an automated process from which human involvement may be omitted.

Thus, the present application discloses systems and methods for performing 3D digital model surface rendering and conversion that overcome the drawbacks and deficiencies in the conventional art. Conventional approaches to lighting 3D digital models that are typically used in game engine pipelines to bake complex lighting scenes into the texture space of a model in order to capture detailed lighting that cannot be rendered in real time, or to make the rendering cheaper when the lighting does not need to be dynamic. Such conventional approaches require the rendering engine itself to support light baking. The proprietary rendering tools and shaders of a VFX pipeline, for example, may not support light baking, and if the light baking were done external to the pipeline it would fail to capture the exact look produced by the pipeline, for instance details such as render-time displacements and procedural geometries. Because the solution disclosed in the present application relies on renders output directly from the image processing pipeline, it is not subject to this limitation.

In addition, the ability to resample arbitrary output variables and warp original source model material textures advances the present solution far beyond what traditional state-of-the-art light baking techniques are able to accomplish. Furthermore, using projections from virtual cameras surrounding a 3D digital model as the means to transfer surface lighting information is more tolerant than the method used by most baking techniques, which typically rely on ray intersection in a local area around the surface. Moreover, the present solution is focused on purely digital use cases and is directed to capturing additional lighting information that is only available from virtual representations. Examples of such additional lighting information include diffuse lighting, reflections, transmission of light, ambient occlusions, UV texture coordinates, and normal maps, to name a few.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. An image processing system comprising:
a computing platform including a processing hardware, a display, and a system memory storing a software code;
the processing hardware configured to execute the software code to:
receive a three-dimensional (3D) digital model represented by a mesh having a first mesh element count;
surround the 3D digital model with a plurality of virtual cameras oriented toward the 3D digital model;
generate, using the plurality of virtual cameras, a plurality of renders of the 3D digital model;
generate a UV texture coordinate space for a surface projection of the 3D digital model having a reduced mesh element count with respect to the first mesh element count;
transfer, using the plurality of renders, lighting color values for each of a plurality of surface portions of the 3D digital model to the UV texture coordinate space to produce the surface projection of the 3D digital model having the reduced mesh element count; and
output the surface projection of the 3D digital model having the reduced mesh element count to the display, wherein the surface projection of the 3D digital model having the reduced mesh element count captures all of the information stored in the plurality of renders of the 3D digital model.

2. The image processing system of claim 1, wherein the lighting color values comprise view independent lighting color values, and wherein to transfer the lighting color values to the UV texture coordinate space, the processing hardware is further configured to execute the software code to:
sample, using the plurality of renders, a plurality of red-green-blue (RGB) color values corresponding respectively to each of the plurality of surface portions of the 3D digital model; and
omit view dependent lighting color values corresponding to light that is at least one of reflected or refracted from one or more of the plurality of surface portions from the RGB color values corresponding to the one or more of the plurality of surface portions to produce the lighting color values for transferring to the UV texture coordinate space.

3. The image processing system of claim 2, wherein the lighting color values are transferred to the UV texture coordinate space as a beauty lighting layer of the surface projection of the 3D digital model.

4. The image processing system of claim 3, wherein the processing hardware is further configured to execute the software code to:
transfer the omitted view dependent lighting color values to the UV texture coordinate space as a view dependent lighting layer of the surface projection of the 3D digital model.

5. The image processing system of claim 1, wherein before generating the plurality of renders of the 3D digital model, the processing hardware is further configured to execute the software code to:
determine, from among the plurality of virtual cameras, a respective best virtual camera for rendering each of the plurality of surface portions of the 3D digital model;
wherein generating the plurality of renders of the 3D digital model comprises rendering each of the plurality of surface portions using the respective best virtual camera.

6. The image processing system of claim 5, wherein the respective best virtual camera is determined based on at least one of a pixel density of each of the surface portions from the perspective of the respective best virtual camera or a lens orientation of the respective best virtual camera relative to an axis perpendicular to each of the surface portions.

7. The image processing system of claim 1, wherein the processing hardware is further configured to execute the software code to:
obtain, using the plurality of renders, at least one additional arbitrary output variable (AOV) layer describing the 3D digital model; and
transfer a plurality of AOV values from the at least one additional AOV layer to the UV texture coordinate space.

8. The image processing system of claim 7, wherein the plurality of AOV values comprise UV texture coordinates of the 3D digital model.

9. The image processing system of claim 7, wherein the at least one additional AOV layer comprises at least one of an ambient occlusion layer or a normal vector layer.

10. The image processing system of claim 1, wherein the surface projection of the 3D digital model includes one or more surface voids, and wherein the processing hardware is further configured to execute the software code to:
inpaint the one or more surface voids.

11. The image processing system of claim 10, wherein the processing hardware is further configured to execute the software code to inpaint each of the one or more surface voids using a partial differential equation (PDE) interpolation technique based on one or more lighting color values at pixels of the surface projection of the 3D digital model at a boundary of each of the one or more surface voids.

12. A method for use by an image processing system including a computing platform having a processing hardware, a display, and a system memory storing a software code, the method comprising:
receiving, by the software code executed by the processing hardware, a three-dimensional (3D) digital model represented by a mesh having a first mesh element count;

surrounding, by the software code executed by the processing hardware, the 3D digital model with a plurality of virtual cameras oriented toward the 3D digital model;

generating, by the software code executed by the processing hardware and using the plurality of virtual cameras, a plurality of renders of the 3D digital model;

generating, by the software code executed by the processing hardware, a UV texture coordinate space for a surface projection of the 3D digital model having a reduced mesh element count with respect to the first mesh element count;

transferring, by the software code executed by the processing hardware and using the plurality of renders, lighting color values for each of a plurality of surface portions of the 3D digital model to the UV texture coordinate space to produce the surface projection of the 3D digital model having the reduced mesh element count; and outputting the surface projection of the 3D digital model having the reduced mesh element count to the display, wherein the surface projection of the 3D digital model having the reduced mesh element count captures all of the information stored in the plurality of renders of the 3D digital model.

13. The method of claim 12, wherein the lighting color values comprise view independent lighting color values, and wherein transferring the lighting color values to the UV texture coordinate space further comprises:

sampling, by the software code executed by the processing hardware and using the plurality of renders, a plurality of red-green-blue (RGB) color values corresponding respectively to each of the plurality of surface portions of the 3D digital model; and omitting, by the software code executed by the processing hardware, view dependent lighting color values corresponding to light that is at least one of reflected or refracted from one or more of the plurality of surface portions from the RGB color values corresponding to the one or more of the plurality of surface portions to produce the lighting color values for transferring to the UV texture coordinate space.

14. The method of claim 13, wherein the lighting color values are transferred to the UV texture coordinate space as a beauty lighting layer of the surface projection of the 3D digital model.

15. The method of claim 14, further comprising:

transferring, by the software code executed by the processing hardware, the omitted view dependent lighting color values to the UV texture coordinate space as a view dependent lighting layer of the surface projection of the 3D digital model.

16. The method of claim 12, wherein before generating the plurality of renders of the 3D digital model, the method further comprises:

determining, by the software code executed by the processing hardware, from among the plurality of virtual cameras, a respective best virtual camera for rendering each of the plurality of surface portions of the 3D digital model;

wherein generating the plurality of renders of the 3D digital model comprises rendering each of the plurality of surface portions using the respective best virtual camera.

17. The method of claim 16, wherein the respective best virtual camera is determined based on at least one of a pixel density of each of the surface portions from the perspective of the respective best virtual camera or a lens orientation of the respective best virtual camera relative to an axis perpendicular to each of the surface portions.

18. The method of claim 12, further comprising:

obtaining, by the software code executed by the processing hardware and using the plurality of renders, at least one additional arbitrary output variable (AOV) layer describing the 3D digital model; and transferring, by the software code executed by the processing hardware, a plurality of AOV values from the at least one additional AOV layer to the UV texture coordinate space.

19. The method of claim 18, wherein the plurality of AOV values comprise UV texture coordinates of the 3D digital model.

20. The method of claim 18, wherein the at least one additional AOV layer comprises at least one of an ambient occlusion layer or a normal vector layer.

21. The method of claim 12, wherein the surface projection of the 3D digital model includes one or more surface voids, the method further comprising:

inpainting, by the software code executed by the processing hardware, the one or more surface voids.

22. The method of claim 21, wherein inpainting each of the one or more surface voids is performed using a partial differential equation (PDE) interpolation technique based on one or more lighting color values at pixels of the surface projection of the 3D digital model at a boundary of each of the one or more surface voids.

* * * * *